US008084387B2

(12) United States Patent
Jun et al.

(10) Patent No.: US 8,084,387 B2
(45) Date of Patent: Dec. 27, 2011

(54) CATALYSTS FOR FISCHER-TROPSCH SYNTHESIS ON COBALT/PHOSPHORUS-ALUMINUM OXIDE AND PREPARATION METHODS THEREOF

(75) Inventors: Ki-won Jun, Daejeon (KR); Jong-Wook Bae, Daejeon (KR); Seung-Moon Kim, Daejeon (KR); Yun-Jo Lee, Daejeon (KR)

(73) Assignees: Korea Research Institute of Chemical Technology, Daejeon (KR); Daelim Industrial Co., Ltd., Seoul (KR); Korea National Oil Corporation, Gyeonggi-do (KR)

( * ) Notice: Subject to any disclaimer, the term of this patent is extended or adjusted under 35 U.S.C. 154(b) by 59 days.

(21) Appl. No.: 12/594,617

(22) PCT Filed: Jan. 30, 2008

(86) PCT No.: PCT/KR2008/000549
§ 371 (c)(1),
(2), (4) Date: Nov. 17, 2009

(87) PCT Pub. No.: WO2009/014292
PCT Pub. Date: Jan. 29, 2009

(65) Prior Publication Data
US 2010/0093523 A1    Apr. 15, 2010

(30) Foreign Application Priority Data
Jul. 26, 2007    (KR) .................. 10-2007-0075065

(51) Int. Cl.
*B01J 27/185*    (2006.01)
*B01J 23/40*    (2006.01)
*B01J 23/42*    (2006.01)
*B01J 23/00*    (2006.01)
*B01J 23/08*    (2006.01)
*C01F 7/02*    (2006.01)
*C07C 27/00*    (2006.01)
*C07C 27/06*    (2006.01)

(52) U.S. Cl. ........ 502/213; 502/327; 502/332; 502/355; 423/625; 423/626; 423/628; 518/715

(58) Field of Classification Search .................. 502/213, 502/327, 332, 355; 423/625, 626, 628; 518/715
See application file for complete search history.

(56) References Cited

U.S. PATENT DOCUMENTS
2,991,256 A * 7/1961 Hauel et al. .................. 502/334
(Continued)

FOREIGN PATENT DOCUMENTS
EP    0167215 A2    1/1986
WO   2006/101305 A1 *  9/2006
WO   2007/009680 A1    1/2007

OTHER PUBLICATIONS

"Effect of support and cobalt precursors on the activity of Co/AlPO4 catalysts in Fischer-Tropsch synthesis," Jong Wook Bae et al. Journal of Molecular Catalysis A: Chemical 311 (2009), pp. 7-16.*

(Continued)

*Primary Examiner* — Patricia L Hailey
(74) *Attorney, Agent, or Firm* — Martin Fleit; Paul D. Bianco; Fleit Gibbons Gutman Bongini & Bianco PL

(57) ABSTRACT

The present invention relates to a cobalt/phosphorus-alumina catalyst in which cobalt is supported as an active component on a phosphorus-alumina support wherein phosphorus is supported on alumina surface. With a bimodal pore structure of pores of relatively different pore sizes, the catalyst provides superior heat- and matter-transfer performance and excellent catalytic reactivity. Especially, when Fischer-Tropsch (F-T) reaction is performed using the catalyst, deactivation by the water produced during the F-T reaction is inhibited and, at the same time, the dispersion and reducing property of cobalt and other active component are improved. Therefore, the cobalt/ phosphorus-alumina catalyst for F-T reaction in accordance with the present invention provides good carbon monoxide conversion and stable selectivity for liquid hydrocarbons.

8 Claims, 2 Drawing Sheets

U.S. PATENT DOCUMENTS

| | | | | |
|---|---|---|---|---|
| 4,395,328 | A * | 7/1983 | Hensley et al. | 208/251 H |
| 4,435,278 | A * | 3/1984 | Chen | 208/251 H |
| 4,520,128 | A * | 5/1985 | Morales et al. | 502/210 |
| 4,649,037 | A * | 3/1987 | Marsh et al. | 423/338 |
| 4,727,209 | A * | 2/1988 | Chao | 585/466 |
| 5,552,361 | A | 9/1996 | Rieser et al. | |
| 7,071,239 | B2 | 7/2006 | Ortego, Jr. et al. | |
| 2002/0010221 | A1 * | 1/2002 | Ionkina et al. | 518/715 |
| 2003/0052047 | A1 * | 3/2003 | Pinnavaia et al. | 208/297 |
| 2005/0107479 | A1 | 5/2005 | Espinoza et al. | |
| 2009/0104108 | A1 * | 4/2009 | Jun et al. | 423/626 |

OTHER PUBLICATIONS

International Search Report published Mar. 26, 2009 for PCT/KR2008/000549 filed Jan. 30, 2008.

Written Opinion of the International Searching Authority mailed Jan. 16, 2009 for PCT/KR2008/000549 filed Jan. 30, 2008.

International Preliminary Report on Patentability published Jan. 26, 2010 for PCT/KR2008/000549 filed Jan. 30, 2008.

* cited by examiner

[Fig. 1]
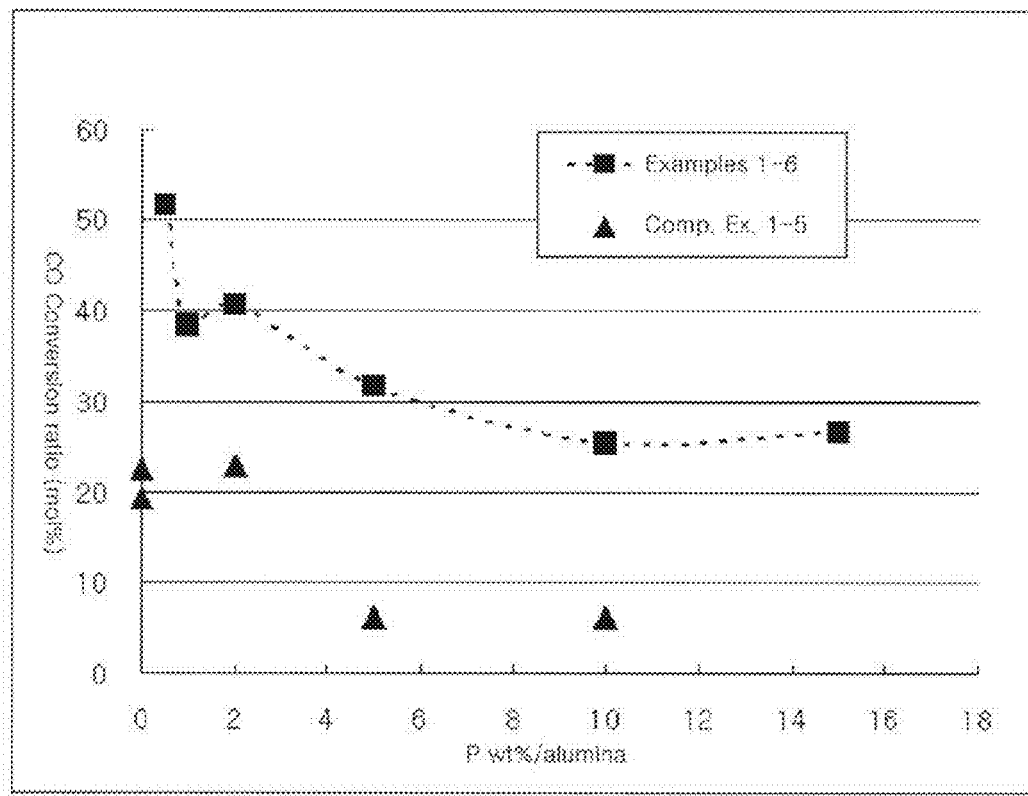
[Fig. 2]
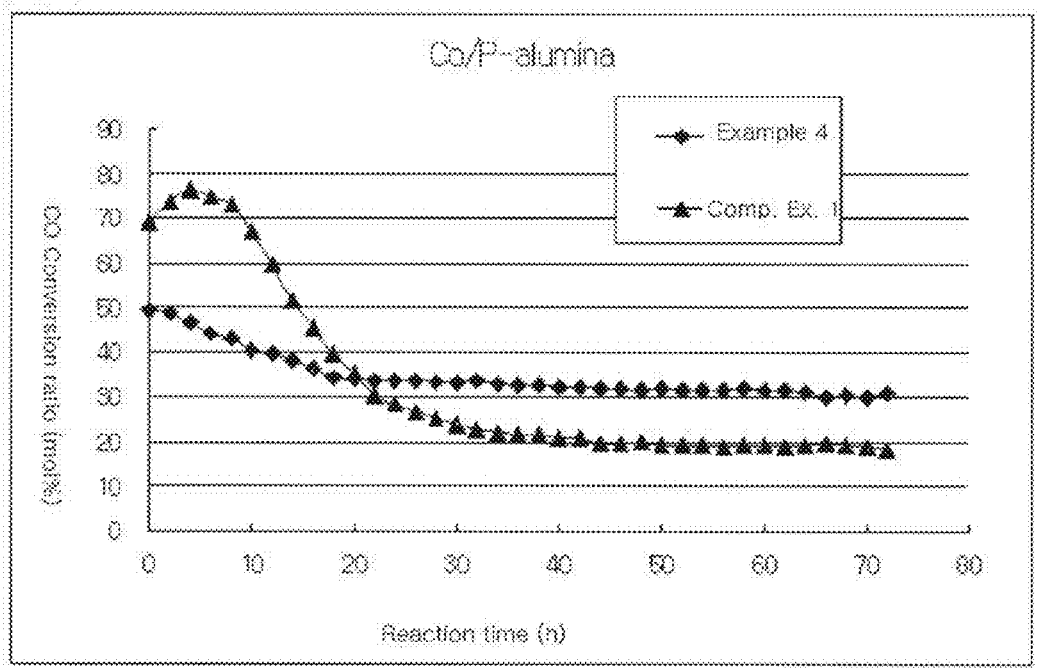

[Fig. 3]
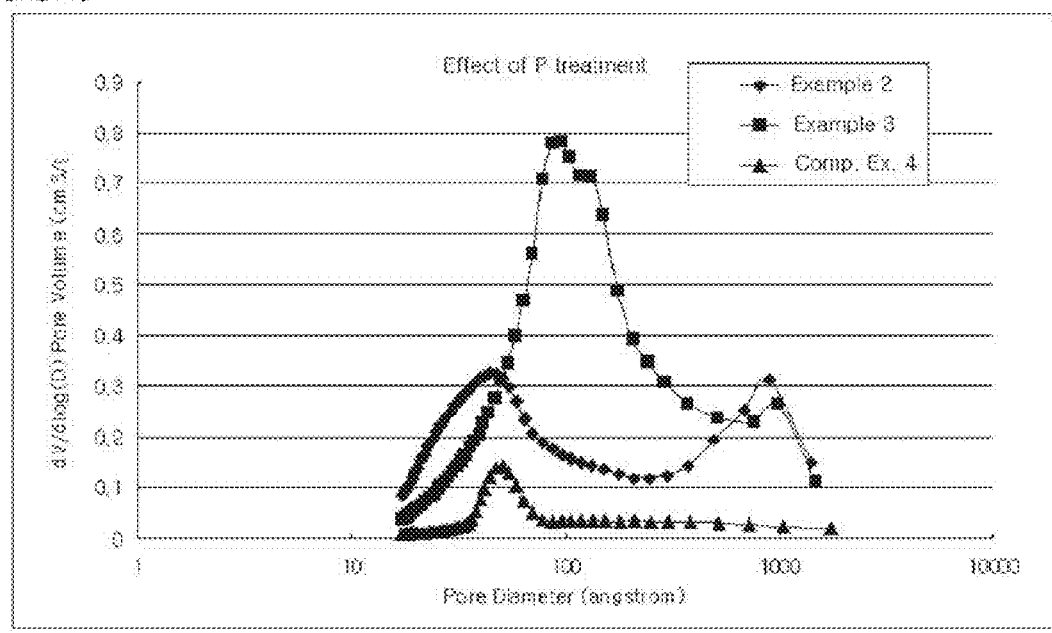

CATALYSTS FOR FISCHER-TROPSCH SYNTHESIS ON COBALT/PHOSPHORUS-ALUMINUM OXIDE AND PREPARATION METHODS THEREOF

TECHNICAL FIELD

The present invention relates to a catalyst for Fischer-Tropsch (F-T) reaction in which cobalt is supported on a phosphorus (P) including alumina support as an active component, a preparation method thereof and a preparation method of liquid hydrocarbons from a syngas resulting from the gasification of natural gas, coal or biomass.

BACKGROUND ART

The Fisher-Tropsch (F-T) synthesis, the core process in the gas-to-liquids (GTL) technique, originates from the preparation of synthetic fuel from syngas by coal gasification invented by German chemists Fischer and Tropsch in 1923. The GTL process is composed of the three major sub-processes of (1) reforming of natural gas, (2) F-T synthesis of syngas and (3) up-grading of product. The F-T reaction which is performed at a reaction temperature of 200 to 350° C. and a pressure of 10 to 30 atm using the iron- and cobalt-based catalysts can be described by the following four key reactions.

(a) Chain Growth in F-T Synthesis

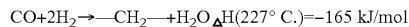
$CO+2H_2 \rightarrow -CH_2-+H_2O \, _\Delta H(227° C.)=-165 \, kJ/mol$ (b) Methanation

$CO+3H_2 \rightarrow CH_4+H_2O \, _\Delta H(227° C.)=-215 \, kJ/mol$ (c) Water Gas Shift Reaction

$CO+H_2O \leftrightarrow CO_2+H_2 \, _\Delta H(227° C.)=-40 \, kJ/mol$ (d) Boudouard Reaction

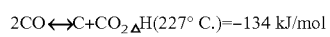
$2CO \leftrightarrow C+CO_2 \, _\Delta H(227° C.)=-134 \, kJ/mol$

For the F-T reaction, mainly iron- and cobalt-based catalysts are used. In early times, iron-based catalysts were preferred. But, recently, cobalt catalysts are predominant in order to increase the production of liquid fuel or wax and to improve conversion. Iron-based catalysts are characterized in that they are the most inexpensive F-T catalysts producing less methane at high temperature and showing high selectivity for olefins and the product can be utilized as a starting material in chemical industry as light olefin or α-olefin, as well as fuel. In addition, a lot of byproducts such as alcohols, aldehydes and ketones, etc., are produced concomitantly with the formation of hydrocarbons. And, the iron-based catalyst are mainly used in the low-temperature F-T reaction for wax production by Sasol which is composed of Cu and K components as cocatalyst and is synthesized by precipitation method using $SiO_2$ as binder. And, Sasol's high-temperature F-T catalyst is prepared by melting magnetite, K, alumina, MgO, etc. The price of cobalt-based catalyst is about 200 times higher than that of Fe catalysts. But, it shows a higher activity, longer lifetime and higher liquid paraffin-based hydrocarbon production yield with lower $CO_2$ generation. However, they can be used only at low temperature because $CH_4$ is produced dominantly at high temperature. And, since the expensive cobalt precursor is used, the catalysts are prepared by dispersing on a stable support with a large surface area, such as alumina, silica, titania, etc. And, a small amount of precious metals such as Pt, Ru and Re, etc., is added as cocatalyst.

The mechanism by which the main product, or the straight-chain hydrocarbons, is produced is mainly explained by the Schulz-Flory polymerization kinetic scheme. In the F-T process, more than 60% of the primary product has a boiling point higher than that of diesel oil. Thus, diesel oil can be produced by the following hydrocracking process and the wax component can be transformed into high-quality lubricant base oil through the dewaxing process.

In general, the current reforming process of atmospheric residue or vacuum residue used in the refinery plant is a reliable one owing to the improvement of catalysts and processing techniques. However, for the F-T synthetic oil, further development of an adequate hydrocarbon reforming process is required, because there is a big difference in compositions and physical properties from the source material used in the refinery plant. Examples of the processes for treating the primary product of the F-T reaction include hydrocracking, dewaxing, isomerization, allylation, and so forth. And, major products of the F-T reaction include naphtha/gasoline, middle distillates with a high centane number, sulfur- and aromatic-free liquid hydrocarbons, α-olefins, oxygenates, waxes, and so forth.

Typically, in order to disperse high-priced active components, cobalt or other activation substance is introduced to a support having a large surface area, such as alumina, silica, titania, etc., to prepare a catalyst. Specifically, in the F-T reaction, a catalyst prepared by dispersing cobalt on a single-component or multi-component support is commercially utilized. However, if the particle size of the cobalt included in the support is similar, the activity of the F-T reaction does not change a lot from one support to another [Applied Catalysis A 161 (1997)59]. On the contrary, the activity of the F-T reaction is greatly affected by the dispersion and particle size of cobalt [Journal of American Chemical Society, 128 (2006) 3956]. Accordingly, a lot of attempts are being made to improve the FTS activity and stability by modifying the surface property of the supports by pre-treating them with different metal components.

For instance, when cobalt-supported alumina is used, the surface characteristics of γ-alumina may be transformed into, for example, that of boehmite because of the water produced during the reaction. As a result, the catalyst may become inactivated or thermal stability may be reduced due to the increased oxidation rate of the cobalt component support. In order to solve this problem, provided is a method of improving the stability of the catalyst by pretreating the surface of alumina using a silicon precursor [WO 2007/009680 A1]. Also, a method of treating an alumina support with a structural stabilizer including various metals such as magnesium, zirconium, barium, boron, lanthanum, etc. in order to improve hydrothermal stability is proposed [U.S. Pat. No. 7,071,239 B2].

As another method of improving the activity of the F-T catalyst, a method of improving the catalyst stability by increasing the transfer rate of the compounds having a high boiling point produced during the F-T reaction and by preparing a silica-alumina catalyst having a bimodal pore structure is reported [US 2005/0107479 A1; Applied Catalysis A 292 (2005) 252].

However, the aforementioned methods are associated with the complicated processes to synthesize the support with a bimodal pore structure using a polymer substrate or physically mixing two alumina-silica gels prepared so as to have different pore sizes and then supporting cobalt or other active component.

In case silica is used as support, decreases of reduction to cobalt metal and consequent reduction of activity are observed due to the strong interaction between cobalt and the support, as compared with the alumina support. It is reported that pretreating the silica surface with zirconium or other metal is effective in overcoming this problem [EP 0167215 A2; *Journal of Catalysis* 185 (1999) 120].

The aforesaid F-T catalysts show various specific surface areas, but the activity of the F-T reaction is known to be closely related with the particle size of the cobalt component, pore size distribution of the support and reducing tendency of the cobalt component. To improve these properties, a preparation method of the F-T catalyst by including the cobalt component through a well-known method on the support prepared through a complicated process is reported.

DISCLOSURE

Technical Problem

Accordingly, an aspect of the present invention is to provide a new concept F-T catalyst for preparing liquid hydrocarbons from a syngas by the F-T reaction, which has improved hydrothermal stability and is capable of reducing the rate of initial deactivation.

Technical Solution

A cobalt/phosphorus-alumina catalyst in which cobalt (Co) is supported on a phosphorus-alumina support, wherein phosphorus (P) is supported as an active component on alumina surface having a specific surface area of 300 to 800 m$^2$/g, has a bimodal pore structure with pores of a relatively smaller pore size $PS_1$ and pores with a larger pore size $PS_2$. Thus, when Fischer-Tropsch (F-T) reaction is performed in the presence of the catalyst, deactivation caused by the water generated during the F-T reaction is inhibited and dispersion and reducing property of cobalt or other active component are improved. As a result, good carbon monoxide conversion and stable selectivity for liquid hydrocarbons can be attained.

Advantageous Effects

In the development of the GTL technique, which is gaining attention as a solution to cope with the abrupt increase in oil cost of recent, the improvement of the F-T synthesis catalyst is directly related with the competitiveness of the GTL technology. In particular, since it is possible to improve thermal efficiency and carbon utilization and to optimize the F-T reaction in the GTL process by improving the catalyst for F-T reaction, a F-T reaction catalyst using the phosphorus-treated alumina support according to the present invention, which is capable of providing stable selectivity for liquid hydrocarbons and inhibiting deactivation provides low selectivity for methane and stable selectivity for liquid hydrocarbons of $C_5$ or more and, thus, is expected to be helpful in the development of a competitive GTL process.

DESCRIPTION OF DRAWINGS

FIG. 1 shows the selectivity for liquid hydrocarbons and carbon monoxide conversion attained by performing F-T reaction using the catalysts prepared in Examples 1 to 6 and Comparative Examples 1 to 5, depending on the phosphorus content of the support.

FIG. 2 shows the carbon monoxide conversion with reaction time when F-T reaction was performed using the catalysts prepared in Example 4 and Comparative Example 1.

FIG. 3 shows the pore size and pore distribution of the catalysts prepared in Examples 2 and 3 and Comparative Example 4.

MODE FOR INVENTION

The present invention provides a catalyst for Fischer-Tropsch reaction in which cobalt is supported on a support as an active component, the catalyst being a cobalt/phosphorus-alumina catalyst in which cobalt is supported on a phosphorus-alumina support in which phosphorus (P) is supported on alumina surface and having a bimodal pore structure with pores of a relatively smaller size $PS_1$ and pores of a larger size $PS_2$, the pore sizes $PS_1$ and $PS_2$ being in the range described below, the phosphorus being comprised 0.05 to 20 wt % per 100 wt % of the alumina and the cobalt (Co) being comprised in 5 to 40 wt % per 100 wt % of the phosphorus-alumina support:

$1 \text{ nm} \leq PS_1 \leq 25 \text{ nm}$; and $25 \text{ nm} < PS_2 \leq 150 \text{ nm}$.

Hereunder is given a detailed description of the present invention.

Conventionally, in the F-T reaction for preparing liquid hydrocarbons from a syngas, a cobalt component or other active component is dispersed on a support having a large specific surface area, such as alumina, silica, titania, etc. In case the alumina support having a large specific surface area is used, the specific surface area tends to decrease by the phosphorus treatment. As compared with when a commonly used alumina support having a relatively small specific surface area, a better F-T reactivity is attained in the view of dispersion of the active cobalt component and inhibition of the deactivation of the catalyst caused by the change of the surface property of the support due to the water or other materials produced during the reaction.

Particularly, as for the alumina, which is the most commonly used as support, the water produced during the F-T reaction may cause the change of the surface property of the γ-alumina to that of boehmite, etc. and, hence, the catalyst tends to experience deactivation or decrease of thermal stability because of the accelerated oxidation of the active cobalt component. To overcome this, there have been attempts to improve F-T reaction activity and stability by pre-treating the support with another metal component, such as boron, zirconium, alkaline earth metal, lanthanum, etc. For instance, as a method of improving hydrothermal stability of alumina, there have been attempts to ensure long-term stability of the catalyst by adding various metallic structural stabilizers, including boron, zirconium, alkaline earth metal, lanthanum, etc., thereby minimizing the change of the surface property alumina and minimizing the transition to cobalt oxide.

The present invention is characterized by a cobalt/phosphorus-alumina catalyst in which cobalt is supported as an active component on a phosphorus-alumina support prepared by supporting phosphorus on alumina having a large specific surface area in order to improve dispersion of the cobalt component while minimizing the change of the surface property of alumina by the water produced during the reaction and consequent formation of oxides such as cobalt aluminate. As described above, phosphorus inhibits the change of the surface property of alumina by the water produced during the reaction and, thereby, inhibits the transition to cobalt oxide, which is known as the cause of the deactivation of the cobalt catalyst and improves the dispersion of the cobalt component. Thus, when compared with the metal components conventionally used to improve physical properties of alumina, such as boron, zirconium, alkaline earth metal, lanthanum, etc., a better hydrothermal stability can be attained and the problem of the decrease of the reducing property caused by the strong interaction between the support and cobalt can be solved. In addition, since the dispersion of the active cobalt component is further improved, liquid hydrocarbons can be produced more efficiently from a syngas by the F-T reaction.

The cobalt/phosphorus-alumina catalyst in accordance with the present invention has a bimodal pore structure with pores of a relatively smaller pore size $PS_1$ and pores of a larger pore size $PS_2$, wherein 1 nm$\leq PS_1 \leq$25 nm and 25 nm$< PS_2 \leq$150 nm. As used herein, the bimodal pore structure refers to the pore structure with smaller and larger pores that can be formed during the preparation of the phosphorus-alumina support and the supporting of the cobalt component. Such pores are formed while the phosphorus and the cobalt components are supported on the alumina support with a large specific surface area and comprising small alumina particles of sub-micron size. As the fine alumina particles coagulate to form large particles, larger pores are formed between the particles. And, the bimodal pore structure is formed as the inside of the larger pores of alumina is coated by phosphorus and cobalt. Especially, the structure develops well when the specific surface area is 150 m$^2$/g or larger. The border of the smaller and larger pore sizes, that is 25 nm, is the approximate pore size at which the distribution of smaller pores decreases and the distribution of larger pores increases, as can be seen from the Barret-Joyner-Halenda (BJH) pore distribution, and is considered as the pore size at which larger pores and smaller pores are divided.

The cobalt/phosphorus-alumina catalyst has a specific surface area of 120 to 400 m$^2$/g and the proportion of the volume $PV_1$ of the smaller pores to the volume $PV_2$ of the larger pores, or $PV_1/PV_2$, is maintained at 0.5 to 2.0. If the specific surface area of the catalyst is smaller than 120 m$^2$/g, dispersion of cobalt decreases and, thus, F-T reactivity may decrease. And, if it exceeds 400 m$^2$/g, reducing property decreases because of the strong interaction between the support and the cobalt component caused by the decrease of cobalt particle size, which results in the decrease of F-T reactivity. If the volume proportion $PV_1/PV_2$ is smaller than 0.5, the total specific surface area of the catalyst decreased because of the increase of larger pores and, resultantly, dispersion of cobalt may decrease. And, if $PV_1/PV_2$ exceeds 2.0, abrupt increase of the specific surface area by the increase of the smaller pores may result in the reducing property caused by the decrease of the particle size of the cobalt component, which results in the decrease of F-T reactivity. Hence, the aforesaid range is preferable.

The present invention is also characterized by a preparation method of a cobalt/phosphorus-alumina catalyst for Fischer-Tropsch reaction.

Specifically, the method comprises the steps of:

mixing an aluminum alkoxide solution dissolved in an alcohol-based organic solvent, organic carboxylic acid having a pKa value of 3.5 to 5 and water and heating at 80 to 130° C. to prepare a boehmite sol and drying and baking the same at 400 to 700° C. to prepare γ-alumina having a specific surface area in the range from 300 to 800 m$^2$/g;

supporting a phosphorus precursor on the γ-alumina and baking at 300 to 800° C. to prepare a phosphorus (P)-alumina support having a specific surface area in the range from 200 to 500 m$^2$/g; and supporting a cobalt precursor on the phosphorus-alumina support and baking at 300 to 800° C. to prepare a cobalt/phosphorus-alumina catalyst having a bimodal pore structure with pores of a smaller size $PS_1$ and pores of a larger size $PS_2$, $PS_1$ and $PS_2$ being in the afore said range.

Each of the three steps of the preparation method according to the present invention is described in detail.

First, an aluminum alkoxide is dissolved in an alcohol based organic solvent to prepare an aluminum alkoxide solution.

For the alcohol based organic solvent, one having 1 to 4 carbon atoms, having a boiling point no higher than 150° C. and easy to dry is used. For example, the alcohol based organic solvent may be selected from methanol, ethanol, 1-propanol, 2-propanol, 1-butanol, 2-butanol and 2-methyl-propanol. Preferably, the alcohol is used in the amount of 5 to 200 mols per 1 mol of the aluminum alkoxide. If it is used less than 5 mols, it is not easy to dissolve the aluminum alkoxide with the alcohol solvent. And, the content in excess of 200 mols is unfavorable in reaction efficiency and economy.

Subsequently, to 1 mol (based on aluminum alkoxide) of the aluminum alkoxide solution, 0.01 to 1 mol of an organic carboxylic acid having a p$K_a$ value of 3.5 to 5 and 2 to 12 mols of water are added and heating is performed to prepare a boehmite sol. Then, hydrolysis occurs rapidly and a white, amorphous aluminum hydroxide precipitate is formed in the alcohol solvent, which is peptized by the organic acid to form nano-sized boehmite sol.

The boehmite sol is an important factor affecting the crystal size and crystallinity, depending on the kind of acid, amount of use and reaction temperature. In the present invention, a $C_1$ to $C_4$ weak organic carboxylic acid having a p$K_a$ value of 3.5 to 5, for example, one selected from formic acid, acetic acid and propionic acid is used. The organic carboxylic acid is used in the amount of 0.01 to 1 mol, more preferably 0.01 to 0.5 mol, per 1 mol of the aluminum alkoxide. If it is used less than 0.01 mol, the intended effect is not attained. And, if an acid is used excessively, the crystal size of boehmite decreases and the sol becomes transparent. As the amount of the acid increases, the aluminum hydroxide formed by the hydrolysis of the aluminum alkoxide is peptized quickly, resulting in more crystal nuclei of boehmite and, consequently, smaller crystal size. Accordingly, the crystal size of boehmite can be easily controlled with the input amount of the acid. Likewise, such physical properties of boehmite as specific surface area, porosity, etc. can be controlled easily. However, if the acid is used more than 1 mol, the organic carboxylic acid may bond with aluminum to form aluminum tricarboxylate. In addition, the use of an organic acid is advantageous over the use of an inorganic acid, because it is easily removable relatively at low drying temperature and the resultant boehmite does not experience change in structure or crystal phase.

The amount of the water used for the hydrolysis is maintained at minimum. It is used in the amount of 2 to 12 mols per 1 mol of the aluminum alkoxide. If it is used less than 2 mols, hydrolysis does not occur sufficiently. And, in excess of 12 mols, the process of separation and recollection becomes complicated.

The reaction is performed at 80 to 130° C. for 1 to 48 hours. If the reaction temperature is below 80° C., crystal growth of boehmite becomes slow, thereby resulting in the formation of impurities such as gibbsite. And, if it exceeds 130° C., the boehmite crystal may become too large.

Such a prepared boehmite sol is baked at 400 to 700° C. to prepare a γ-alumina support. If the baking temperature is below 400° C., the crystal growth of alumina is retarded. And, if it exceeds 700° C., specific surface area decreases abruptly due to the change of the alumina phase. Thus, it is recommended to prepare the γ-alumina in the aforesaid range. The prepared γ-alumina has a specific surface area of 300 to 800 m$^2$/g. If the specific surface area of the support is smaller than 300 m$^2$/g, the specific surface area may decrease significantly during the supporting of phosphorus. And, if it exceeds 800 m²/g, pores may be overly clogged or thermal stability may decrease during the supporting of phosphorus. Hence, the aforesaid range is preferable.

Next, after supporting a phosphorus precursor on the prepared γ-alumina, baking is performed at 300 to 800° C. to prepare a phosphorus-alumina support.

The phosphorus precursor may be one commonly used in the art and is not particularly limited. But, specifically, a compound selected from phosphoric acid ($H_3PO_4$), phosphorus oxychloride ($POCl_3$), phosphorus pentoxide ($P_2O_5$) and phosphorus trichloride ($PCl_3$) or a mixture thereof may be used.

The phosphorus-alumina support is prepared by supporting the phosphorus precursor by the method commonly used in the art, such as direct supporting, co-precipitation, etc., followed by baking. The baking is performed at 300 to 800° C. If the baking temperature is below 300° C., the effect of the modification of the alumina surface by the phosphorus precursor is minimal. And, if it exceeds 800° C., pores may be clogged due to sintering, which results in the decrease of the specific surface area of the support. Hence, the aforesaid range is preferable.

Such phosphorus-alumina support comprises 0.05 to 20 wt % of phosphorus per 100 wt % of alumina and has a specific surface area of 200 to 500 m²/g.

If the supporting amount of phosphorus is below 0.05 wt %, the effect of modification of alumina surface by the addition of phosphorus is minimal and thus the improvement of F-T reactivity becomes also minimal. And, if it exceeds 20 wt %, the pores of alumina are clogged by the phosphorus component, which results in the decrease of the specific surface area of the catalyst. And, if the specific surface area is smaller than 200 m²/g, dispersion of cobalt decreases during the supporting of the cobalt component and, thus, F-T reactivity decreases. And, if it exceeds 500 m²/g, reducing property of cobalt decreases due to the storing interaction between cobalt and the support, which also causes the decrease of F-T reactivity. Hence, the aforesaid range is preferable.

Next, after supporting the cobalt precursor on the phosphorus-alumina support, baking is performed at 300 to 800° C., preferably at 400 to 700° C. The supporting of the catalyst may be performed by the method commonly used in the art, including impregnation, co-precipitation, etc. Specifically, impregnation is performed at 40 to 90° C. in an aqueous solution or an alcohol solution. The resultant precipitate is washed and used as catalyst after drying in an oven of for about 100° C. or above for about 24 hours.

And, co-precipitation is performed by co-precipitating the cobalt precursor in a slurry of the phosphorus-alumina support in an aqueous solution of pH 7 to 8 and aging at 40 to 90° C. The resultant precipitate is filtered and washed to obtain a phosphorus-treated alumina support comprising 5 to 40 wt % of the cobalt component per 100 wt % of the support. During the co-precipitation, a basic precipitant is used to maintain pH at 7 to 8. Preferably, sodium carbonate, calcium carbonate, ammonium carbonate, ammonia water, etc. are used. The aging of the catalyst is performed for 0.1 to 10 hours, preferably for 0.5 to 8 hours. This proposed aging time is suitable for obtaining a cobalt-supported support with superior activity. If the aging time is shorter, F-T reactivity is unfavorable because of decreased dispersion of cobalt. And, if it exceeds 10 hours, the number of active sites decreases and the synthesis time increases because of increased particle size of cobalt. The prepared cobalt/phosphorus-alumina catalyst is washed and dried to obtain the final cobalt-supported F-T catalyst. After washing and drying in an oven of for about 100° C. or above for about a day, the prepared precipitate may be directly used for the synthesis of the F-T reaction catalyst or may be used after supporting a secondary precious metal catalyst component and baking.

The cobalt precursor may be one commonly used in the art and is not particularly limited. Specifically, a compound selected from nitrate, acetate and chloride or a mixture thereof may be used. Optionally, an activity promoter such as rhenium, ruthenium and platinum may be further added. The activity promoter may be supported in 0.05 to 1 wt % per 100 wt % of the support to further improve the activity of the catalyst.

If the baking temperature is below 300° C., the solvent and the precursor component may remain in the catalyst and cause side reactions. And, if it exceeds 800° C., the particle size of the active component increases by sintering, which may result in the decrease of the dispersion of cobalt or other active component as well as the decrease of the specific surface area of the support. Hence, it is preferable to maintain the aforesaid condition.

In the resultant cobalt/phosphorus-alumina catalyst, the supporting amount of cobalt is 5 to 40 wt % per 100 wt % of the phosphorus-alumina support. If the supporting amount is below 5 wt %, F-T reactivity decreases because of insufficient active component. And, if it exceeds 40 wt %, the cost of catalyst manufacture increases. Hence, the aforesaid range is preferable.

The present invention further provides a preparation method of liquid hydrocarbons from a syngas by Fischer-Tropsch reaction in the presence of the prepared catalyst. The F-T reaction is performed using the catalyst in a fixed bed, a fluidized bed or a slurry reactor, in the temperature range of from 200 to 700° C., after reducing under hydrogen atmosphere. Using the reduced F-T reaction catalyst, F-T reaction is performed under a standard condition, specifically at a temperature of 300 to 500° C., at a pressure of 30 to 60 kg/cm² and at a space velocity of 1000 to 10000 $h^{-1}$, although not limited thereto.

Such prepared catalyst provides an F-T reaction conversion of 20 to 60 carbon mol % under the condition of 220° C., 20 atm and a space velocity of 2000 $h^{-1}$ and a selectivity for hydrocarbons with five carbon atoms or more, specifically naphtha, diesel, middle distillate, heavy oil, wax, etc., of 15 to 40 carbon mol %.

Hereinafter, the present invention is described in detail through examples. However, the following examples do not limit the present invention.

EXAMPLE 1

Alumina having a large surface area was prepared by sol-gel method. Acetic acid and water were added to the slurry prepared by mixing aluminum isopropoxide with a 2-propanol solution. Amorphous aluminum hydroxide was obtained through hydrolysis. The molar proportion of the reactants aluminum isopropoxide, 2-propanol, acetic acid and water was maintained at 1:25:0.1:3. The prepared slurry solution was aged at 90° C. and 1 atm for 20 hours while refluxing 2-propanol. Then, a boehmite powder was attained by drying in an oven kept at 100° C. The boehmite powder was baked at 500° C. for 5 hours to obtain alumina having a large surface area (specific surface area=455 m²/g).

For 5 g of the prepared alumina, 0.093 g of phosphoric acid ($H_3PO_4$) was dissolved in 60 mL of water to prepare phosphorus-supported alumina, which was baked at 500° C. for 5 hours to prepare a phosphorus-alumina support in the form of powder. The prepared phosphorus-alumina support had a specific surface area of 400 m²/g.

3 g of the powdery phosphorus-alumina support was mixed with 3.055 g of cobalt nitrate $(Co(NO_3)_2 \cdot 6H_2O)$, a cobalt precursor, dissolved in 60 mL of deionized water and stirred at room temperature for over 12 hours. Then, after drying at 100° C. for over 12 hours, baking was performed at 400° C. under air atmosphere for 5 hours to prepare a cobalt/phosphorus-alumina catalyst. The composition of the catalyst was 20 wt % Co/0.5 wt % P-γ-$Al_2O_3$ based on metal weight and the final specific surface area was 168 $m^2/g$.

0.3 g of the catalyst was put in a ½-inch stainless steel fixed bed reactor and reduced for 12 hours under hydrogen atmosphere (5 vol % $H_2$/He) at 400° C. prior to performing reaction. Subsequently, the reactants carbon monoxide, hydrogen, carbon dioxide and argon (internal standard) were supplied to the reactor at a fixed molar proportion of 28.4:57.3:9.3:5 under the condition of: reaction temperature=220° C.; reaction pressure=20 $kg/cm^2$; and space velocity=2000 L/kg cat/hr. The Fischer-Tropsch reaction result is summarized in Table 1. The steady-state condition was obtained after around 60 hour operation and the averaged values for 10 hours at the steady-state were taken.

EXAMPLE 2

A cobalt/phosphorus-alumina catalyst was prepared in the same manner as in Example 1, except for using 0.186 g of phosphoric acid ($H_3PO_4$) per 5 g of alumina to prepare a phosphorus-supported alumina and supporting 3.055 g of cobalt nitrate $(Co(NO_3)_2 \cdot 6H_2O)$. The composition of the catalyst was 20 wt % Co/1.0 wt % P-γ-$Al_2O_3$ based on metal weight and the final specific surface area was 201 $m^2/g$.

0.3 g of the catalyst was put in a ½-inch stainless steel fixed bed reactor and reduced for 12 hours under hydrogen atmosphere (5 vol % $H_2$/He) at 400° C. prior to performing reaction. Subsequently, the reactants carbon monoxide, hydrogen, carbon dioxide and argon (internal standard) were supplied to the reactor at a fixed molar proportion of 28.4:57.3:9.3:5 under the condition of: reaction temperature=220° C.; reaction pressure=20 $kg/cm^2$; and space velocity=2000 L/kg cat/hr. The Fischer-Tropsch reaction result is summarized in Table 1. The steady-state condition was obtained after around 60 hour operation and the averaged values for 10 hours at the steady-state were taken.

EXAMPLE 3

A cobalt/phosphorus-alumina catalyst was prepared in the same manner as in Example 1, except for using 0.372 g of phosphoric acid ($H_3PO_4$) per 5 g of alumina to prepare a phosphorus-supported alumina and supporting 3.055 g of cobalt nitrate $(Co(NO_3)_2 \cdot 6H_2O)$. The composition of the catalyst was 20 wt % Co/2.0 wt % P-γ-$Al_2O_3$ based on metal weight and the final specific surface area was 222 $m^2/g$.

0.3 g of the catalyst was put in a ½-inch stainless steel fixed bed reactor and reduced for 12 hours under hydrogen atmosphere (5 vol % $H_2$/He) at 400° C. prior to performing reaction. Subsequently, the reactants carbon monoxide, hydrogen, carbon dioxide and argon (internal standard) were supplied to the reactor at a fixed molar proportion of 28.4:57.3:9.3:5 under the condition of: reaction temperature=220° C.; reaction pressure=20 $kg/cm^2$; and space velocity=2000 L/kg cat/hr. The Fischer-Tropsch reaction result is summarized in Table 1. The steady-state condition was obtained after around 60 hour operation and the averaged values for 10 hours at the steady-state were taken.

EXAMPLE 4

A cobalt/phosphorus-alumina catalyst was prepared in the same manner as in Example 1, except for using 0.930 g of phosphoric acid ($H_3PO_4$) per 5 g of alumina to prepare a phosphorus-supported alumina and supporting 3.055 g of cobalt nitrate $(Co(NO_3)_2 \cdot 6H_2O)$. The composition of the catalyst was 20 wt % Co/5.0 wt % P-γ-$Al_2O_3$ based on metal weight and the final specific surface area was 132 $m^2/g$.

0.3 g of the catalyst was put in a ½-inch stainless steel fixed bed reactor and reduced for 12 hours under hydrogen atmosphere (5 vol % $H_2$/He) at 400° C. prior to performing reaction. Subsequently, the reactants carbon monoxide, hydrogen, carbon dioxide and argon (internal standard) were supplied to the reactor at a fixed molar proportion of 28.4:57.3:9.3:5 under the condition of: reaction temperature=220° C.; reaction pressure=20 $kg/cm^2$; and space velocity=2000 L/kg cat/hr. The Fischer-Tropsch reaction result is summarized in Table 1. The steady-state condition was obtained after around 60 hour operation and the averaged values for 10 hours at the steady-state were taken.

EXAMPLE 5

A cobalt/phosphorus-alumina catalyst was prepared in the same manner as in Example 1, except for using 1.861 g of phosphoric acid ($H_3PO_4$) per 5 g of alumina to prepare a phosphorus-supported alumina and supporting 3.055 g of cobalt nitrate $(Co(NO_3)_2 \cdot 6H_2O)$. The composition of the catalyst was 20 wt % Co/10 wt % P-γ-$Al_2O_3$ based on metal weight and the final specific surface area was 128 $m^2/g$.

0.3 g of the catalyst was put in a ½-inch stainless steel fixed bed reactor and reduced for 12 hours under hydrogen atmosphere (5 vol % $H_2$/He) at 400° C. prior to performing reaction. Subsequently, the reactants carbon monoxide, hydrogen, carbon dioxide and argon (internal standard) were supplied to the reactor at a fixed molar proportion of 28.4:57.3:9.3:5 under the condition of: reaction temperature=220° C.; reaction pressure=20 $kg/cm^2$; and space velocity=2000 L/kg cat/hr. The Fischer-Tropsch reaction result is summarized in Table 1. The steady-state condition was obtained after around 60 hour operation and the averaged values for 10 hours at the steady-state were taken.

EXAMPLE 6

A cobalt/phosphorus-alumina catalyst was prepared in the same manner as in Example 1, except for using 2.792 g of phosphoric acid ($H_3PO_4$) per 5 g of alumina to prepare a phosphorus-supported alumina and supporting 3.055 g of cobalt nitrate $(Co(NO_3)_2 \cdot 6H_2O)$. The composition of the catalyst was 20 wt % Co/15 wt % P-γ-$Al_2O_3$ based on metal weight and the final specific surface area was 122 $m^2/g$.

0.3 g of the catalyst was put in a ½-inch stainless steel fixed bed reactor and reduced for 12 hours under hydrogen atmosphere (5 vol % $H_2$/He) at 400° C. prior to performing reaction. Subsequently, the reactants carbon monoxide, hydrogen, carbon dioxide and argon (internal standard) were supplied to the reactor at a fixed molar proportion of 28.4:57.3:9.3:5 under the condition of: reaction temperature=220° C.; reaction pressure=20 $kg/cm^2$; and space velocity=2000 L/kg cat/hr. The Fischer-Tropsch reaction result is summarized in Table 1. The steady-state condition was obtained after around 60 hour operation and the averaged values for 10 hours at the steady-state were taken.

EXAMPLE 7

The procedure of Example 1 was repeated, except for performing the Fischer-Tropsch reaction under the condition of: reaction temperature=240° C.; reaction pressure=20 $kg/cm^2$;

and space velocity=2000 L/kg cat/hr. The reaction result is summarized in Table 1. The steady-state condition was obtained after around 60 hour operation and the averaged values for 10 hours at the steady-state were taken.

EXAMPLE 8

The procedure of Example 2 was repeated, except for performing the Fischer-Tropsch reaction under the condition of: reaction temperature=240° C.; reaction pressure=20 kg/cm$^2$; and space velocity=2000 L/kg cat/hr. The reaction result is summarized in Table 1. The steady-state condition was obtained after around 60 hour operation and the averaged values for 10 hours at the steady-state were taken.

EXAMPLE 9

The procedure of Example 3 was repeated, except for performing the Fischer-Tropsch reaction under the condition of: reaction temperature=240° C.; reaction pressure=20 kg/cm$^2$; and space velocity=2000 L/kg cat/hr. The reaction result is summarized in Table 1. The steady-state condition was obtained after around 60 hour operation and the averaged values for 10 hours at the steady-state were taken.

EXAMPLE 10

The procedure of Example 4 was repeated, except for performing the Fischer-Tropsch reaction under the condition of: reaction temperature=240° C.; reaction pressure=20 kg/cm$^2$; and space velocity=2000 L/kg cat/hr. The reaction result is summarized in Table 1. The steady-state condition was obtained after around 60 hour operation and the averaged values for 10 hours at the steady-state were taken.

EXAMPLE 11

The procedure of Example 5 was repeated, except for performing the Fischer-Tropsch reaction under the condition of: reaction temperature=240° C.; reaction pressure=20 kg/cm$^2$; and space velocity=2000 L/kg cat/hr. The reaction result is summarized in Table 1. The steady-state condition was obtained after around 60 hour operation and the averaged values for 10 hours at the steady-state were taken.

EXAMPLE 12

The procedure of Example 6 was repeated, except for performing the Fischer-Tropsch reaction under the condition of: reaction temperature=240° C.; reaction pressure=20 kg/cm$^2$; and space velocity=2000 L/kg cat/hr. The reaction result is summarized in Table 1. The steady-state condition was obtained after around 60 hour operation and the averaged values for 10 hours at the steady-state were taken.

COMPARATIVE EXAMPLE 1

A cobalt/phosphorus-alumina catalyst was prepared in the same manner as in Example 1, except for using an alumina support commercially available from Strem (specific surface area=200 m$^2$/g). The composition of the catalyst was 20 wt % Co/γ-Al$_2$O$_3$ based on metal weight and the final specific surface area was 140 m$^2$/g.

0.3 g of the catalyst was put in a ½-inch stainless steel fixed bed reactor and reduced for 12 hours under hydrogen atmosphere (5 vol % H$_2$/He) at 400° C. prior to performing reaction. Subsequently, the reactants carbon monoxide, hydrogen, carbon dioxide and argon (internal standard) were supplied to the reactor at a fixed molar proportion of 28.4: 57.3:9.3:5 under the condition of: reaction temperature=220° C.; reaction pressure=20 kg/cm$^2$; and space velocity=2000 L/kg cat/hr. The Fischer-Tropsch reaction result is summarized in Table 1. The steady-state condition was obtained after around 60 hour operation and the averaged values for 10 hours at the steady-state were taken.

COMPARATIVE EXAMPLE 2

A cobalt/phosphorus-alumina catalyst was prepared in the same manner as in Example 1, except for using a pure alumina support having a large specific surface area and with no phosphorus supported thereon. The composition of the catalyst was 20 wt % Co/γ-Al$_2$O$_3$ based on metal weight and the final specific surface area was 243 m$^2$/g.

0.3 g of the catalyst was put in a ½-inch stainless steel fixed bed reactor and reduced for 12 hours under hydrogen atmosphere (5 vol % H$_2$/He) at 400° C. prior to performing reaction. Subsequently, the reactants carbon monoxide, hydrogen, carbon dioxide and argon (internal standard) were supplied to the reactor at a fixed molar proportion of 28.4: 57.3:9.3:5 under the condition of: reaction temperature=220° C.; reaction pressure=20 kg/cm$^2$; and space velocity=2000 L/kg cat/hr. The Fischer-Tropsch reaction result is summarized in Table 1. The steady-state condition was obtained after around 60 hour operation and the averaged values for 10 hours at the steady-state were taken.

COMPARATIVE EXAMPLE 3

A cobalt/phosphorus-alumina catalyst was prepared in the same manner as in Example 3, except for using an alumina support commercially available from Sasol (Catapal B; specific surface area=198 m$^2$/g). The composition of the catalyst was 20 wt % Co/2 wt % P-γ-Al$_2$O$_3$ based on metal weight and the final specific surface area was 52 m$^2$/g.

0.3 g of the catalyst was put in a ½-inch stainless steel fixed bed reactor and reduced for 12 hours under hydrogen atmosphere (5 vol % H$_2$/He) at 400° C. prior to performing reaction. Subsequently, the reactants carbon monoxide, hydrogen, carbon dioxide and argon (internal standard) were supplied to the reactor at a fixed molar proportion of 28.4: 57.3:9.3:5 under the condition of: reaction temperature=220° C.; reaction pressure=20 kg/cm$^2$; and space velocity=2000 L/kg cat/hr. The Fischer-Tropsch reaction result is summarized in Table 1. The steady-state condition was obtained after around 60 hour operation and the averaged values for 10 hours at the steady-state were taken.

COMPARATIVE EXAMPLE 4

A cobalt/phosphorus-alumina catalyst was prepared in the same manner as in Example 4, except for using an alumina support commercially available from Strem (specific surface area=200 m$^2$/g). The composition of the catalyst was 20 wt % Co/5 wt % P-γ-Al$_2$O$_3$ based on metal weight and the final specific surface area was 36 m$^2$/g.

0.3 g of the catalyst was put in a ½-inch stainless steel fixed bed reactor and reduced for 12 hours under hydrogen atmosphere (5 vol % H$_2$/He) at 400° C. prior to performing reaction. Subsequently, the reactants carbon monoxide, hydrogen, carbon dioxide and argon (internal standard) were supplied to the reactor at a fixed molar proportion of 28.4: 57.3:9.3:5 under the condition of: reaction temperature=220° C.; reaction pressure=20 kg/cm$^2$; and space velocity=2000

L/kg cat/hr. The Fischer-Tropsch reaction result is summarized in Table 1. The steady-state condition was obtained after around 60 hour operation and the averaged values for 10 hours at the steady-state were taken.

COMPARATIVE EXAMPLE 5

A cobalt/phosphorus-alumina catalyst was prepared in the same manner as in Example 5, except for using an alumina support commercially available from Strem (specific surface area=200 m$^2$/g). The composition of the catalyst was 20 wt % Co/10 wt % P-γ-Al$_2$O$_3$ based on metal weight and the final specific surface area was 25 m$^2$/g.

0.3 g of the catalyst was put in a ½-inch stainless steel fixed bed reactor and reduced for 12 hours under hydrogen atmosphere (5 vol % H$_2$/He) at 400° C. prior to performing reaction. Subsequently, the reactants carbon monoxide, hydrogen, carbon dioxide and argon (internal standard) were supplied to the reactor at a fixed molar proportion of 28.4:57.3:9.3:5 under the condition of: reaction temperature=220° C.; reaction pressure=20 kg/cm$^2$; and space velocity=2000 L/kg cat/hr. The Fischer-Tropsch reaction result is summarized in Table 1. The steady-state condition was obtained after around 60 hour operation and the averaged values for 10 hours at the steady-state were taken.

COMPARATIVE EXAMPLE 6

The procedure of Comparative Example 2 was repeated, except for performing the Fischer-Tropsch reaction under the condition of: reaction temperature=240° C.; reaction pressure=20 kg/cm$^2$; and space velocity=2000 L/kg cat/hr. The reaction result is summarized in Table 1. The steady-state condition was obtained after around 60 hour operation and the averaged values for 10 hours at the steady-state were taken.

COMPARATIVE EXAMPLE 7

The procedure of Comparative Example 3 was repeated, except for performing the Fischer-Tropsch reaction under the condition of: reaction temperature=240° C.; reaction pressure=20 kg/cm$^2$; and space velocity=2000 L/kg cat/hr. The reaction result is summarized in Table 1. The steady-state condition was obtained after around 60 hour operation and the averaged values for 10 hours at the steady-state were taken.

COMPARATIVE EXAMPLE 8

The procedure of Comparative Example 4 was repeated, except for performing the Fischer-Tropsch reaction under the condition of: reaction temperature=240° C.; reaction pressure=20 kg/cm$^2$; and space velocity=2000 L/kg cat/hr. The reaction result is summarized in Table 1. The steady-state condition was obtained after around 60 hour operation and the averaged values for 10 hours at the steady-state were taken.

COMPARATIVE EXAMPLE 9

The procedure of Comparative Example 5 was repeated, except for performing the Fischer-Tropsch reaction under the condition of: reaction temperature=240° C.; reaction pressure=20 kg/cm$^2$; and space velocity=2000 L/kg cat/hr. The reaction result is summarized in Table 1. The steady-state condition was obtained after around 60 hour operation and the averaged values for 10 hours at the steady-state were taken.

TABLE 1

| | CO conversion (carbon mol %) | Selectivity C$_1$/C$_2$ to C$_4$/C$_5$ or more (carbon mol %) | Yield C$_5$ or more (%) | BET surface area | Pore volume ratio (PV$_1$/PV$_2$) |
|---|---|---|---|---|---|
| Ex. 1 | 51.7 | 16.6/14.2/69.2 | 35.8 | 168 | 1.86 |
| Ex. 2 | 38.3 | 14.2/10.2/75.6 | 28.9 | 201 | 1.16 |
| Ex. 3 | 40.6 | 8.6/11.2/80.2 | 32.6 | 222 | 1.94 |
| Ex. 4 | 31.6 | 11.3/13.4/75.3 | 23.8 | 132 | 0.84 |
| Ex. 5 | 25.3 | 19.2/14.2/66.6 | 16.9 | 128 | |
| Ex. 6 | 26.5 | 15.4/14.2/70.4 | 18.7 | 122 | |
| Ex. 7 | 93.9 | 18.2/15.9/65.9 | 61.9 | — | |
| Ex. 8 | 58.0 | 21.6/14.8/63.6 | 36.9 | — | |
| Ex. 9 | 72.2 | 17.2/15.6/67.2 | 48.5 | — | |
| Ex. 10 | 76.6 | 15.7/14.3/70.0 | 53.6 | — | |
| Ex. 11 | 55.5 | 21.2/17.3/61.5 | 34.1 | — | |
| Ex. 12 | 58.5 | 20.1/15.6/64.3 | 37.6 | — | |
| Comp. Ex. 1 | 19.2 | 18.7/16.6/64.7 | 12.4 | 140 | |
| Comp. Ex. 2 | 22.5 | 12.2/14.0/73.8 | 16.6 | 243 | |
| Comp. Ex. 3 | 23.0 | 23.0/17.3/59.7 | 13.7 | 52 | |
| Comp. Ex. 4 | 6.1 | 29.2/32.6/38.2 | 2.3 | 36 | |
| Comp. Ex. 5 | 6.0 | 16.6/21.1/62.3 | 3.8 | 25 | |
| Comp. Ex. 6 | 45.2 | 18.7/17.3/64.0 | 28.9 | — | |
| Comp. Ex. 7 | 35.8 | 27.0/17.5/55.5 | 19.9 | — | |
| Comp. Ex. 8 | 29.9 | 21.1/20.3/58.6 | 17.5 | — | |
| Comp. Ex. 9 | 19.1 | 18.6/20.7/60.7 | 11.6 | — | |

As shown in Table 1, the cobalt/phosphorus-alumina catalysts in accordance with the present invention (Examples 1 to 12) were superior in selectivity for liquid hydrocarbons (C$_5$ or more) and carbon monoxide conversion to Comparative Examples 1 to 9.

Specifically, FIG. 1 shows selectivity for liquid hydrocarbons and carbon monoxide conversion attained by performing F-T reaction using the catalysts prepared in Examples 1 to 6 and Comparative Examples 1 to 5, depending on the phosphorus content of the support. When alumina having a large surface area was treated with phosphorus, the specific surface area of alumina decreased significantly when the phosphorus content was 20 wt % or more, which may negatively affect the F-T reaction activity. The selectivity for liquid hydrocarbons was the most superior when the alumina having a large surface area was treated with 2 wt % of phosphorus (Example 3).

FIG. 2 shows carbon monoxide conversion with reaction time when F-T reaction was performed using the catalysts prepared in Example 4 and Comparative Example 1. As for the phosphorus-supported catalyst (Example 4), the change of the surface property of alumina decreased and, thus, the deactivation of the decreased and term long-stability of the catalyst improved due to the increased hydrothermal stability of the support. This can also be confirmed in Examples 7 to 12 and Comparative Examples 6 to 9, where the F-T reaction was performed at 240° C.

FIG. 3 shows pore size and pore distribution of the catalysts prepared in Examples 2 and 3 and Comparative Example 4. Whereas the catalyst of the present invention prepared by supporting cobalt on phosphorus-treated alumina having a large surface area showed a bimodal pore structures with pores having a pore size smaller than 25 nm and pores having a pore size larger than 25 nm, the catalyst prepared using commercially available alumina had pores having a pore size smaller than 10 nm only. When both larger and smaller pores were present, good FT reactivity was attained due to superior matter- and heat-transfer performance.

It will be apparent to those skilled in the art that various modifications and variations can be made in the present invention without departing from the spirit or scope of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A cobalt/phosphorus-alumina catalyst for a Fischer-Tropsch reaction in which cobalt is supported on a support as an active component, the catalyst including cobalt (Co) supported on a phosphorus-alumina support in which the phosphorus (P) is supported on an alumina surface, the phosphorus having 0.05 to 20 wt % per 100 wt % of the alumina and the cobalt having 5 to 40 wt % per 100 wt % of the phosphorus-alumina support, and the catalyst having a bimodal pore structure with pores of a relatively smaller size $PS_1$ and pores of a larger size $PS_2$, wherein the pore sizes $PS_1$ and $PS_2$ are;

$1 \text{ nm} \leq PS_1 \leq 25 \text{ nm}$; and $25 \text{ nm} < PS_2 \leq 150 \text{ nm}$.

2. The cobalt/phosphorus-alumina catalyst as claimed in claim 1, wherein the catalyst has a specific surface area of 120 to 400 m$^2$/g.

3. The cobalt/phosphorus-alumina catalyst as claimed in claim 1, wherein a proportion of volume $PV_1$ of the smaller pores to volume $PV_2$ of the larger pores, or $PV_1/PV_2$, is maintained at 0.5 to 2.0.

4. A method for preparing the cobalt/phosphorus-alumina catalyst of claim 1 comprising the steps of:

mixing an aluminum alkoxide solution dissolved in an alcohol-based organic solvent, organic carboxylic acid having a pKa value of 3.5 to 5, and water;

heating the mixture at 80 to 130° C. to prepare a boehmite sol and drying;

baking the same at 400 to 700° C. to prepare γ-alumina having a specific surface area in a range from 300 to 800 m$^2$/g;

supporting a phosphorus precursor on the γ-alumina;

baking at 300 to 800° C. to prepare a phosphorus (P)-alumina support having a specific surface area in a range from 200 to 500 m$^2$/g;

supporting a cobalt precursor on the phosphorus-alumina support; and baking at 300 to 800° C. to prepare a cobalt/phosphorus-alumina catalyst having a bimodal pore structure with pores of a smaller size $PS_1$ and pores of a larger size $PS_2$, wherein the pore sizes $PS_1$ and $PS_2$ are:

$1 \text{ nm} \leq PS_1 \leq 25 \text{ nm}$; and $25 \text{ nm} < PS_2 \leq 150 \text{ nm}$.

5. The method as claimed in claim 4, wherein the phosphorus precursor is a compound selected from the group consisting of phosphoric acid ($H_3PO_4$), phosphorus oxychloride ($POCl_3$), phosphorus pentoxide ($P_2O_5$), phosphorus trichloride ($PCl_3$), and mixtures thereof.

6. The method as claimed in claim 4, wherein the phosphorus-alumina support has 0.05 to 20 wt % of phosphorus supported per 100 wt % of alumina.

7. The method as claimed in claim 4, wherein the cobalt precursor is a compound selected from the group consisting of a nitrate salt, an acetate salt, a chloride salt, and mixtures thereof.

8. The method as claimed in claim 4, wherein 5 to 40 wt % of cobalt is supported per 100 wt % of the phosphorus-alumina support in the cobalt/phosphorus-alumina catalyst.

* * * * *

UNITED STATES PATENT AND TRADEMARK OFFICE
CERTIFICATE OF CORRECTION

PATENT NO. : 8,084,387 B2  
APPLICATION NO. : 12/594617  
DATED : December 27, 2011  
INVENTOR(S) : Ki-won Jun et al.

Page 1 of 1

It is certified that error appears in the above-identified patent and that said Letters Patent is hereby corrected as shown below:

Title Page, Item (73) should read (73): Assignees: Korea Research Institute of Chemical Technology, Daejeon, Republic of Korea  
Daelim Industrial Co., Ltd., Seoul, Republic of Korea  
Korea National Oil Corporation, Gyeonggi-do, Republic of Korea  
Hyundai Engineering Co. Ltd., Seoul, Republic of Korea  
SK Innovation Co., Ltd., Seoul, Republic of Korea  
Korea Gas Corporation, Gyeonggi-do, Republic of Korea Signed and Sealed this  
Thirteenth Day of March, 2012

David J. Kappos  
*Director of the United States Patent and Trademark Office*